Nov. 12, 1957 F. J. GOFFNETT 2,812,766
SPRING LOADED STONE TRAP FOR COMBINES
Filed Aug. 1, 1955 3 Sheets-Sheet 1

FRED J. GOFFNETT
INVENTOR.
BY
ATTORNEY

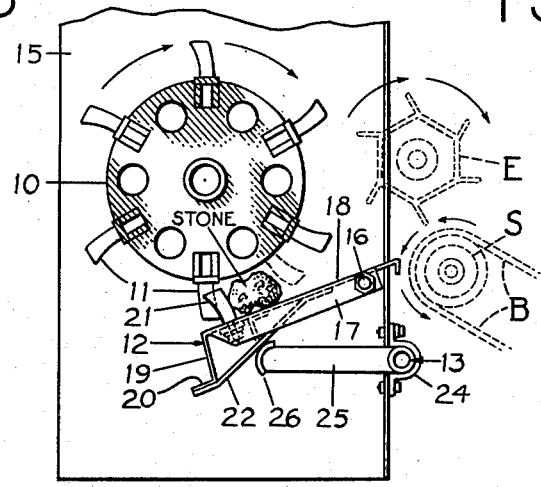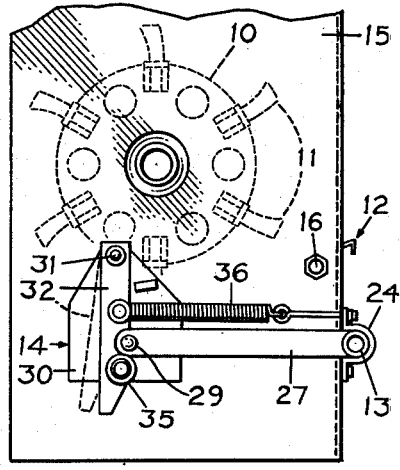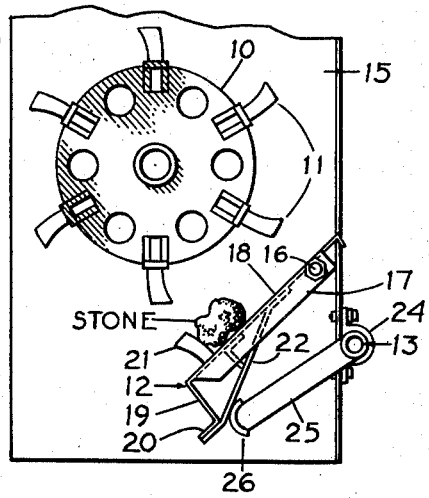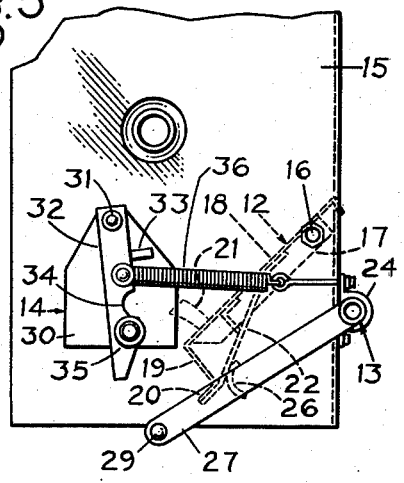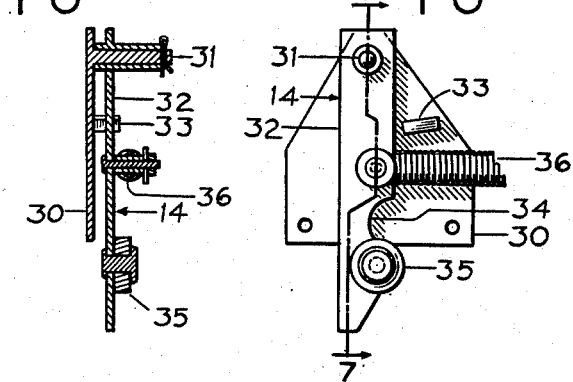

Nov. 12, 1957 F. J. GOFFNETT 2,812,766
SPRING LOADED STONE TRAP FOR COMBINES
Filed Aug. 1, 1955 3 Sheets-Sheet 3
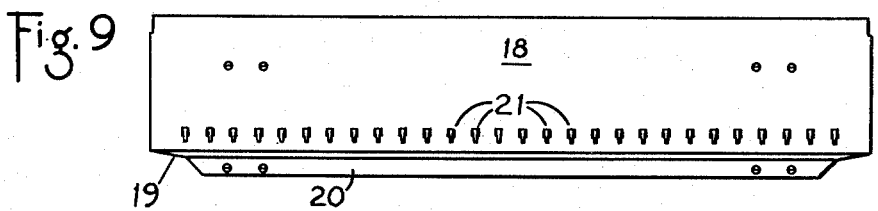
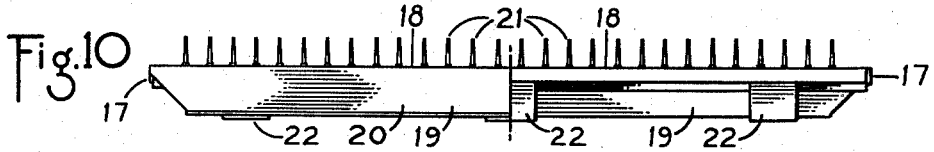
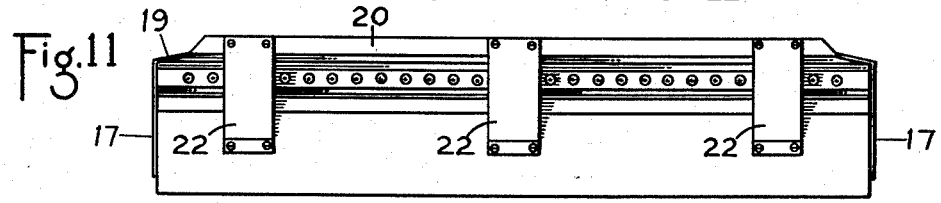
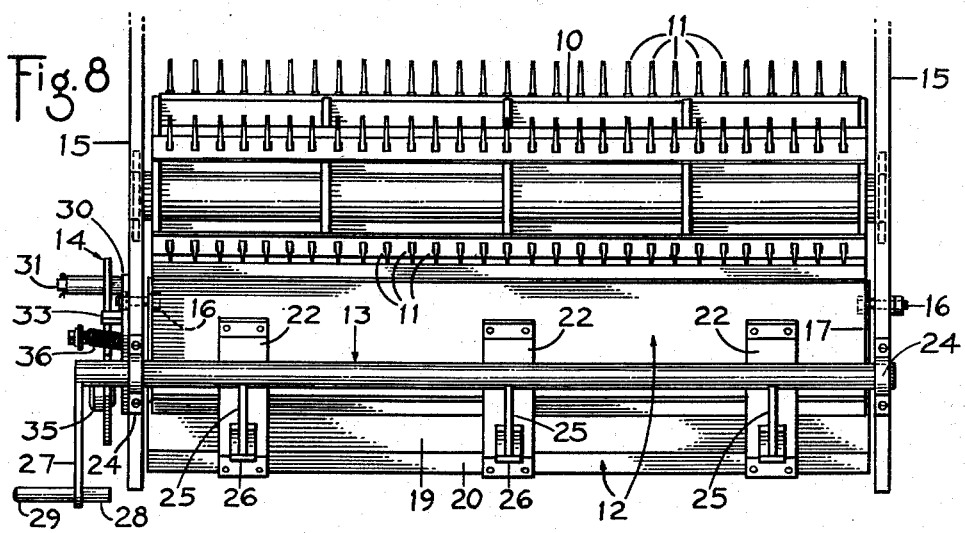
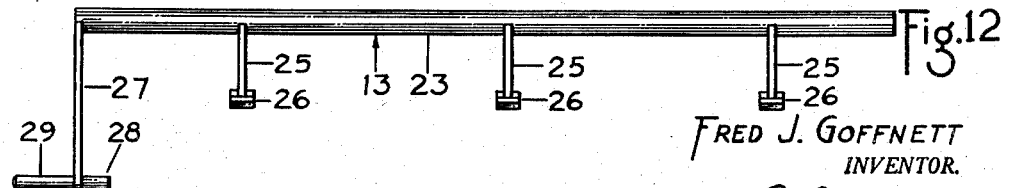
FRED J. GOFFNETT
INVENTOR.
BY
ATTORNEY

# United States Patent Office 2,812,766
Patented Nov. 12, 1957

2,812,766

SPRING LOADED STONE TRAP FOR COMBINES

Fred J. Goffnett, Shepherd, Mich.

Application August 1, 1955, Serial No. 525,632

5 Claims. (Cl. 130—27)

This invention relates to a spring loaded stone trap for combines.

The invention is adapted for operative association with harvesting and threshing combines such as are manufactured by Massey-Harris having branches in various cities in the United States and while the present invention is adaptable for operative association with combines for various crops, it is particularly adapted for use in combines for harvesting beans.

Combines with which the invention is operatively associated generally comprise a full-floating table on whose forward end is disposed a reel for urging the growth into contact with a cutter bar beneath the reel, an endless belt supported on the table whose rear end is disposed beneath a beater element.

Rearwardly of and adjacent to said beater element is a cylinder beneath which is an adjustable concave and a straw rack extends rearwardly from said concave.

While stones and other foreign bodies have heretofore presented a problem in the harvesting of various crops, it has been notably true in the harvesting of edible beans with combines of the above noted general character wherein the stones or other foreign bodies were occasionally picked up in the windrow and carried into the combine with resulting serious damage to the cylinder and the concave. Such damage results not only in a loss of time in the harvesting of the crop but also entails considerable expense in restoring the damaged parts to a working condition.

It is well known that attempts have heretofore been made to overcome this difficulty in various ways, but without actual complete preventative results so far as damage to the combine is concerned.

It is accordingly a primary object of this invention to provide relatively simple means in operative association with a combine of the above noted general character whereby stones or other foreign objects are automatically trapped and prevented from passing through the combine with resulting damage to the cylinder, the concave and possibly other parts.

A further object of the invention is to provide a stone trap in operative association with a modified form of cylinder and wherein the trap is yieldably supported in operative stone trapping position and is moved to an inoperative position by means of engagement of the cylinder with the stone which in the inoperative position of the trap is out of range of the cylinder.

Other objects and advantages of the invention will become apparent in the course of the following detailed description, taken in connection with the accompanying drawings, wherein—

Fig. 2 is an end elevational view of the invention and wherein the foremost side wall of the combine housing is removed, the view showing a stone as having been picked up by the combine and in a position just prior to its discharge.

Fig. 3 is a view similar to Fig. 2, but showing the mechanism in a position for the removal of the stone.

Fig. 4 is a view similar to Fig. 3, but wherein the foremost side wall of the housing is in place and including the structural details which are mounted on the outer face of such wall.

Fig. 5 is a view similar to Fig. 4, but showing the structural elements on the foremost side wall in a position for releasing the stone, as shown in Fig. 3.

Fig. 6 is an enlarged fragmental side elevational view of the discharge mechanism.

Fig. 7 is a vertical sectional view as observed in the plane of line 7—7 on Fig. 6.

Fig. 8 is a front elevational view of the invention, wherein the edges of the side walls of the said housing are shown.

Fig. 9 is a top plan view of the trip plate embodied as an element in the invention.

Fig. 10 is an elevational view, the left hand half showing the rearmost edge of the trip plate, and the right hand half showing the foremost edge of the trip plate.

Fig. 11 is a bottom plan view of the trip plate, and

Fig. 12 is a lengthwise view of the rocker element.

Figure 1:
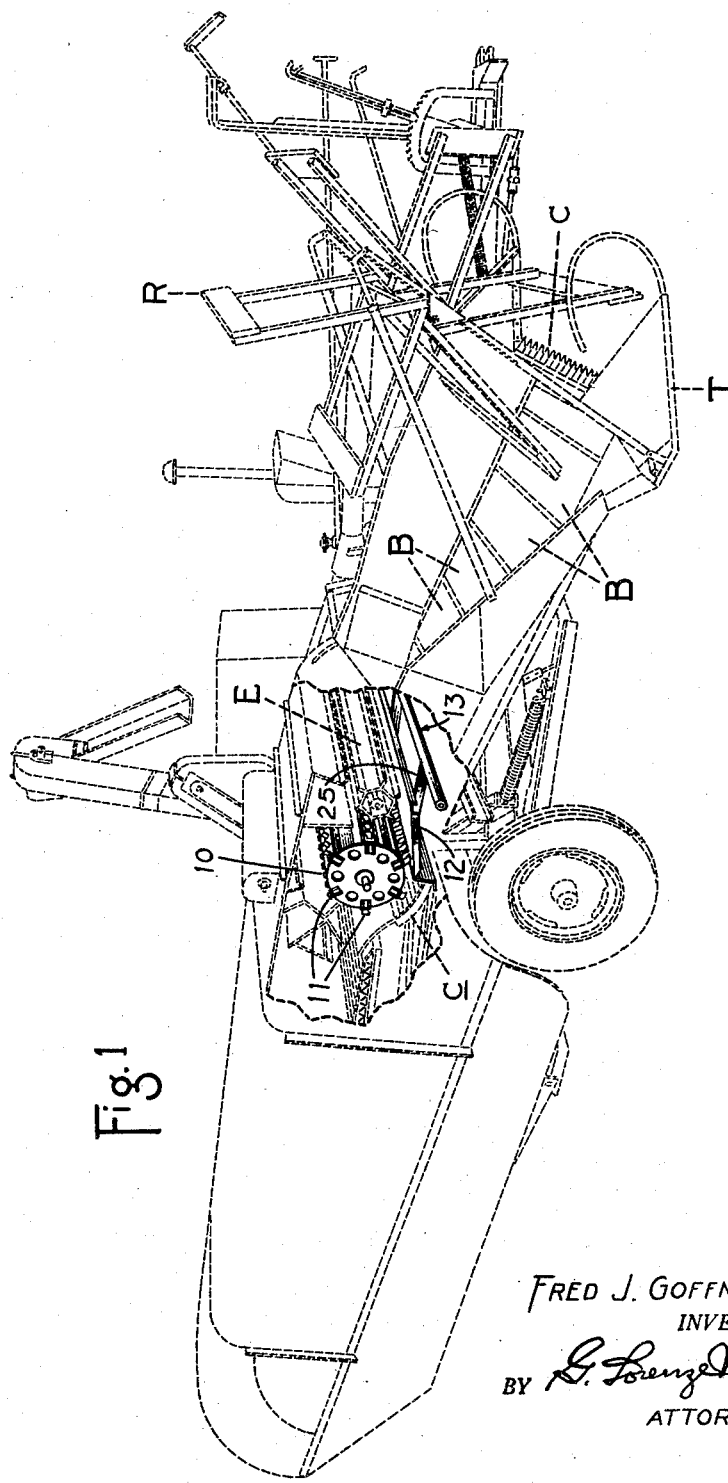
Fig. 1 is a perspective view of a combine in dotted lines with a portion of its central structure broken away to disclose a portion of the invention, shown in solid lines.

Referring now in detail to the drawings, and first more particularly to Fig. 1, wherein a combine is shown as including a floating table T on whose forward edge is disposed a cutter bar C and which supports a reel R above the cutter bar. An endless belt B is movably supported on the table T and whose rearmost roller support S is indicated in Fig. 2.

Disposed above the roller support S is a beater element E. The combine further includes a cylinder 10 beneath which is a concave C and a straw rack and screen extend rearwardly from the cylinder 10.

The cylinder 10, as heretofore used, was provided with axially extending rasp bars and for the purpose of the present invention such rasp bars have been replaced by radially extending steel fingers 11.

The present invention comprises mechanism cooperating with the fingered cylinder 10 for trapping a stone or other hard foreign object. Such mechanism comprises in general a trip plate 12, a rocker member 13 and a spring biased latch mechanism 14, see Fig. 4.

At this point it is to be observed that the cylinder 10, trip plate 12, rocker member 13 and latch mechanism 14 are supported by the side walls 15 of a housing, the axle of the rotatable cylinder extending through such walls.

The trip plate 12 is disposed between the housing side walls 15 and is rotatably supported thereby through the instrumentality of bolts 16 which extend through end flanges 17 of the trip plate and through the said side walls.

As is indicated in Figs. 2 to 5, the pivot axis of the trip plate is adjacent corresponding vertical edges of the housing side walls 15 and the free longitudinal edge of the trip plate is normally disposed substantially vertically below the axis of the cylinder 10.

The trip plate comprises in addition to the end flanges 17, a plane top wall 18 and a longitudinal flange 19 depending from the inner edge of top wall 18 and which flange merges into a right angularly disposed flange 20.

A longitudinal series of steel fingers 21 project upwardly from the top wall 18 adjacent the inner edge thereof and are so disposed that the fingers 11 on cylinder 10 extend between same.

The trip plate 12 further includes three inclined plate members 22 which are disposed beneath the top wall 18 and which diverge therefrom to the flange 20 and which plate members in fact function as cam members.

The trip plate 12 is movable from the position shown in Fig. 2 to the position shown in Fig. 3 and vice versa and the movement of the plate is controlled by the rocker member 13.

The rocker member 13 comprises an elongated shaft 23 which is rotatably supported in brackets 24 secured to corresponding vertical edges of the housing side walls 15. The member further includes three arms 25, each of which is provided on its free end with a cam shoe 26 which slidably engages a corresponding plate member 22 on the trip plate 12 and one end of shaft 23 is provided with a radial handle 27 adjacent whose free end is an inwardly extending latch member 28 and an outwardly extending lifting member 29 which is preferably coaxial with member 28.

The latch mechanism 14 comprises a plate 30 which is rigidly secured to the outer face of one of the housing side walls 15 and which is provided adjacent its upper end with a pivot pin 31 on which is rotatably supported the upper end of a latch arm 32 which is engageable with a stop lug 33 on the plate 30 in its non-latching position, as in Fig. 5.

The latch arm 32 is provided with a notch 34 intermediate its ends and is also provided with a roller 35 immediately below the notch. The notch 34 is adapted to receive the latch member 28 in the operative position of the structure and a relatively heavy coil spring 36 has one end thereof secured to the arm 32 intermediate the pin 31 and the notch 34 and its opposite end is secured to one of the brackets 24.

The spring functions to normally hold the latch member 28 in the notch 34 when the trip plate 12 is in its upper operative position of Fig. 2 and draws the arm 32 into contact with the stop lug 33 when the trip plate is in its lower position of Fig. 3.

Having set forth the structure involved in the invention, the operation thereof is as follows:

The trip plate 12 is normally retained in its upper latched position, as indicated in Fig. 2, and wherein the fingers 11 on the cylinder 10 pass between the fingers 21 on the trip plate and the cooperating fingers function to break apart the straw and shake out a considerable amount of grain (or beans) before it reaches other threshing means interiorly of the combine.

In the event of a stone or other foreign object entering the combine, same is moved onto the top plate 18 of the trip plate 12 by the fingers 11 on the cylinder 10 until such stone or other object engages teeth 21 on the trip plate, as is indicated in Fig. 2.

Upon continued rotation of the cylinder in a clockwise direction, as indicated by the arrows on Fig. 2, the stone will be strongly urged against the fingers 21 on the trip plate which will cause the latch member 28 to be cammed out of the notch 34 against the action of spring 36 and the rocker member 13 will drop to the position in Fig. 3 with a resulting dropping of the trip plate 12 whereby the stone will be out of range of the cylinder fingers 11 but will be trapped for manual removal thereof.

It is to be noted that the handle 27 is parallel with the arms 25 and when a stone enters the combine, an operator will be advised of such fact by a resulting noise and vibration as well as by the position of the handle.

The roller 35 provides for ease of retraction of the latch member 28 from the notch 34.

When a stone is moved to the position in Fig. 3, the operator stops the combine and removes the stone after which he pushes the rocker member 13 upwardly until the latch member 28 again enters the notch 34 whereby the trip plate 12 is again in its normal position of Fig. 2.

It is to be observed that in the event that the combine continues to operate before removal of the stone from the trip plate 12 in its position of Fig. 3, no damage can be done to the combine.

Having disclosed my invention in accordance with a preferred structural embodiment thereof, what I claim and desire to secure by U. S. Letters Patent is—

I claim:

1. Means for trapping a stone which may be drawn into a combine including a housing, a cylinder rotatably supported in said housing and having radially projecting fingers thereon, a stone receiving trip plate disposed beneath said cylinder and having one edge thereof pivotally supported by said housing and with the opposite edge thereof disposed substantially vertically beneath the axis of said cylinder, a longitudinal series of fingers projecting upwardly at substantially a right angle to the top of said trip plate adjacent said opposite edge and extending between the teeth on said cylinder, means yieldably supporting said trip plate in its stone receiving position wherein fingers on said cylinder draw the stone into contact with the fingers on said trip plate, and said yieldable supporting means comprising trip plate latch means which are released by pressure by said stone on said plate fingers with a resulting movement of said trip plate to a lowered position wherein the stone is trapped by the fingers thereon and which fingers are out of range of the fingers on said cylinder.

2. Means for trapping a stone or other foreign object which may be drawn into a combine including a housing having a cylinder rotatably supported therein, said cylinder being provided with radially projecting fingers, a stone receiving trip plate disposed beneath said cylinder and having one edge thereof pivotally supported by opposite side walls of said housing and with the opposite free edge thereof disposed substantially vertically beneath the axis of said cylinder, a plurality of inclined cam plate members on the bottom of said trip plate, a rocker member pivotally supported by said side walls and having cam means operatively engaged with said cam plate members, said rocker member being provided with a latch member, and latch mechanism including a vertical arm pivotally secured to one of said side walls adjacent its upper end, a notch in one edge of said arm for receiving said latch member, and yieldable means normally urging said arm to a position wherein said latch member is disposed in said notch with said trip plate in its normal upper stone receiving position.

3. The structure according to claim 2, wherein said cam means on said rocker member comprise a plurality of arms having cam shoes on their outer ends engaged with said inclined cam plate members.

4. The structure according to claim 2, wherein said arm is provided with a roller beneath said notch for guiding said latch member into and out of same.

5. The structure according to claim 2, wherein said arm is pivotally connected to a plate secured to the outer face of one of said side walls, said yieldable means comprising a coil spring having one end thereof secured to said arm and the opposite end thereof secured to said housing, and a stop lug on said plate engageable by said arm under the influence of said spring when said trip plate is in its lowered position.

References Cited in the file of this patent

UNITED STATES PATENTS

| | | |
|---|---|---|
| 2,305,159 | Heckman et al. | Dec. 15, 1942 |
| 2,528,232 | Krause | Oct. 31, 1950 |